(12) United States Patent
Yoshida et al.

(10) Patent No.: US 6,628,028 B2
(45) Date of Patent: Sep. 30, 2003

(54) SMALL AND FLAT VIBRATIONAL MOTOR HAVING IMPACT-RESISTANT STRUCTURE

(75) Inventors: Shigeru Yoshida, Tottori (JP); Kodo Fukuoka, Tottori (JP); Kouji Kuyama, Tottori (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/770,697

(22) Filed: Jan. 26, 2001

(65) Prior Publication Data

US 2001/0030477 A1 Oct. 18, 2001

(30) Foreign Application Priority Data

Jan. 28, 2000 (JP) ........................................ 2000-019820

(51) Int. Cl.$^7$ .......................... H02K 5/00; H02K 11/00; H02K 7/00
(52) U.S. Cl. ........................ 310/91; 310/71; 310/68 R; 310/67 R; 310/66
(58) Field of Search .......................... 310/91, 71, 68 R, 310/67 R, 66, 40 R, 10

(56) References Cited

U.S. PATENT DOCUMENTS

| | | | |
|---|---|---|---|
| 4,673,837 A | 6/1987 | Gingerich et al. | 310/239 |
| 4,771,199 A | 9/1988 | Johannes | 310/90 |
| 4,836,792 A | 6/1989 | Glover | 439/81 |
| 4,853,568 A | 8/1989 | Fujiwara | 310/68 C |

(List continued on next page.)

FOREIGN PATENT DOCUMENTS

| | | |
|---|---|---|
| EP | 0 437 312 | 7/1991 |
| EP | 0 466 402 | 1/1992 |
| EP | 0 511 876 | 11/1992 |
| EP | 0 539 094 | 4/1993 |

(List continued on next page.)

OTHER PUBLICATIONS

European Search Report corresponding to application No. EP 01 10 1818 dated Feb. 27, 2002.
International Search Report for application No. PCT/JP00/06829, Apr. 3, 2001.
International Search Report for application No. PCT/JP00/06829, Jan. 26, 2001.
European Search Report, application No. 01101818.1, dated Jul. 1, 2002.

*Primary Examiner*—Nestor Ramirez
*Assistant Examiner*—Pedro J. Cuevas
(74) *Attorney, Agent, or Firm*—RatnerPrestia

(57) ABSTRACT

A bearing supporter and stator supporter concentric with the bearing supporter and for being mounted with a stator assembly are provided on a motor base. Around the bearing supporter, lower faces of metal terminals are exposed from a bottom face of a base section. The stator assembly is fit on and fixed to the stator supporter. Further the motor base has a stator stopper protruded from the base section, and the stator stopper faces closely a lower end face of an outer wall of the stator assembly in axial direction. This structure allows a motor to be reflow-soldered to a board of an apparatus using this motor, and increases impact-resistance against radial load and thrust load applied to a radial and thrust bearings, a coupling section of the bearing supporter and the motor base, a coupling section of a shaft, a coupling section of the motor and the apparatus.

6 Claims, 8 Drawing Sheets

U.S. PATENT DOCUMENTS

| | | | | |
|---|---|---|---|---|
| 4,933,582 A | * | 6/1990 | Hata et al. | 310/154.14 |
| 4,969,829 A | | 11/1990 | Sato | 439/83 |
| 5,036,239 A | * | 7/1991 | Yamaguchi | 310/268 |
| 5,066,884 A | * | 11/1991 | Takagi et al. | 310/323.05 |
| 5,107,155 A | * | 4/1992 | Yamaguchi | 310/81 |
| 5,256,922 A | | 10/1993 | Tanaka et al. | 310/71 |
| 5,333,079 A | | 7/1994 | Takegami et al. | 360/99.08 |
| 5,357,160 A | | 10/1994 | Kaneda et al. | 310/67 R |
| 5,391,952 A | | 2/1995 | Simazu et al. | 310/67 R |
| 5,394,479 A | | 2/1995 | Ishigaya et al. | 381/188 |
| 5,475,274 A | | 12/1995 | Katakura | 310/67 R |
| 5,604,389 A | | 2/1997 | Nitta et al. | 310/67 R |
| 5,606,208 A | | 2/1997 | Sakashita et al. | 310/71 |
| 5,633,542 A | * | 5/1997 | Yuhi et al. | 310/40 MM |
| 5,635,781 A | * | 6/1997 | Moritan | 310/71 |
| 5,668,423 A | | 9/1997 | You et al. | 310/81 |
| 5,705,868 A | | 1/1998 | Cox et al. | 310/71 |
| 5,793,133 A | * | 8/1998 | Shiraki et al. | 310/81 |
| 5,798,588 A | | 8/1998 | Okuyama et al. | 310/81 |
| 5,821,674 A | * | 10/1998 | Weiner | 310/68 D |
| 5,831,355 A | | 11/1998 | Oku | 310/42 |
| 5,894,263 A | | 4/1999 | Shimakawa et al. | 340/388.1 |
| 5,942,833 A | * | 8/1999 | Yamaguchi | 310/268 |
| 5,990,597 A | * | 11/1999 | Takagi et al. | 310/323.04 |
| 6,011,333 A | * | 1/2000 | Yamaguchi et al. | 310/81 |
| 6,051,900 A | * | 4/2000 | Yamaguchi | 310/81 |
| 6,097,120 A | * | 8/2000 | Horng | 310/90.5 |
| 6,097,121 A | * | 8/2000 | Oku | 310/91 |
| 6,107,723 A | * | 8/2000 | Fujimoto | 310/323.09 |
| 6,169,348 B1 | * | 1/2001 | Won | 310/81 |
| 6,265,838 B1 | * | 7/2001 | Won | 318/114 |
| 6,274,955 B1 | * | 8/2001 | Satoh et al. | 310/71 |
| 6,281,608 B1 | * | 8/2001 | Matsushima | 310/51 |
| 6,291,915 B1 | * | 9/2001 | Yamaguchi | 310/71 |
| 6,305,976 B1 | | 10/2001 | Tsuji et al. | 439/570 |
| 6,365,995 B1 | * | 4/2002 | Fukuda et al. | 310/81 |
| 6,384,498 B1 | * | 5/2002 | Yamaguchi et al. | 310/81 |
| 6,384,499 B2 | * | 5/2002 | Yamaguchi | 310/81 |
| 6,452,298 B1 | * | 9/2002 | Fukuda et al. | 310/89 |
| 6,455,962 B2 | * | 9/2002 | Suzuki et al. | 310/71 |
| 6,465,919 B1 | * | 10/2002 | Yoshida et al. | 310/71 |
| 6,479,914 B2 | * | 11/2002 | Yoshida et al. | 310/81 |
| 6,492,899 B1 | * | 12/2002 | Yamaguchi | 340/407.1 |
| 6,507,136 B1 | * | 1/2003 | Yamaguchi | 310/128 |
| 6,525,439 B2 | * | 2/2003 | Whelan et al. | 310/68 R |
| 6,528,913 B1 | * | 3/2003 | Michaels | 310/71 |
| 6,528,915 B1 | * | 3/2003 | Moskob | 310/71 |
| 6,538,352 B2 | * | 3/2003 | Asao | 310/68 D |
| 6,541,883 B2 | * | 4/2003 | Uffelman | 310/71 |
| 6,541,891 B2 | * | 4/2003 | Yamaguchi | 310/268 |
| 6,555,937 B2 | * | 4/2003 | Kurahashi et al. | 310/71 |

FOREIGN PATENT DOCUMENTS

| | | |
|---|---|---|
| EP | 0 665 545 | 8/1995 |
| EP | 0 774 824 | 5/1997 |
| EP | 1 016 467 | 7/2000 |
| JP | S64-40274 | 3/1989 |
| JP | 02-261043 | 10/1990 |
| JP | 04-087538 | 3/1992 |
| JP | 05-103451 | 4/1993 |
| JP | 5-122886 | 5/1993 |
| JP | 06-038432 | 2/1994 |
| JP | 06-225484 | 8/1994 |
| JP | 07-123633 | 5/1995 |
| JP | 07-123672 | 5/1995 |
| JP | 07-336924 | 12/1995 |
| JP | 08-019229 | 1/1996 |
| JP | 09-070162 | 3/1997 |
| JP | 10-108433 | 4/1998 |
| JP | 10-295068 | 4/1998 |
| JP | 10-127031 | 5/1998 |
| JP | 10-248203 | 9/1998 |
| JP | 10-295058 | 11/1998 |
| JP | WO99/41020 | 8/1999 |
| WO | WO 01/43261 | 6/2001 |

* cited by examiner

SMALL AND FLAT VIBRATIONAL MOTOR HAVING IMPACT-RESISTANT STRUCTURE

FIELD OF THE INVENTION

The present invention relates to a small and flat motor, and an apparatus, e.g. a portable apparatus, using the same motor. More particularly, it relates to an impact-resistant motor construction, in which terminals used for mounting the motor to the apparatus are disposed on a bottom face of the motor.

BACKGROUND OF THE INVENTION

Recently, a small and flat motor to be mounted to a portable apparatus has been required to have impact-resistance in addition to small and thin profile as well as light in weight. A vibration motor, among others, used in a cellular phone is required to be impact resistant as high as 10,000–20,000 G. On the other hand, a "slimmed-down version" has been always required.

Several methods have been adopted to increase the impact resistance, such as respective elements is thickened to bear an impact-load, an entire construction has high rigidity, respective components are rigidly attached with each other, and the like. For the portable apparatus, however, a sturdily built version does not satisfy market demand because the "sturdily built" increases not only its own weight but also load to its supporting structure. This phenomenon goes against the "slim-down" requirement and fails to satisfy the impact-resistance requirement.

The impact-resistance requirement of 10,000–20,000 G is the severest for the motor having ever confronted. An effective conventional technique to deal with this requirement is thus hardly found. The inventors of the present invention, therefore, analyze which part is broken, and what kind of stress is applied, in order to meet the requirement.

In the case of an outer-rotor-type flat motor with cores, they find the following weak points: radial and thrust bearings, a coupling section between a bearing supporter and a motor base, coupling section of a shaft, a coupling section between a motor and an apparatus, and a magnet. Loads applied to respective sections can be divided into radial load and thrust load. On top of these loads, impact in a rotating direction exists; however, it can be neglected because it affects a little.

SUMMARY OF THE INVENTION

The present invention addresses the problem discussed above and aims to provide a slimmed down motor having an improved impact-resistance, and an apparatus using the same motor.

The motor of the present invention comprises the following elements:
- a rotor;
- a stator assembly facing the rotor;
- a motor base including:
  - a base;
  - a bearing supporter for supporting a bearing vertically with respect to the base;
  - a stator supporter for being mounted with the stator assembly and being substantially concentric with the bearing supporter;
  - metal terminals disposed around the bearing supporter, and the lower faces of the terminals being exposed from a bottom face of the base.

An inner wall of the stator assembly is fit on and fixed to an outer wall of the stator supporter. Further, a stator stopper protruded from the base is prepared. The stopper and a lower end face of the outer wall of the stator assembly are closely faced with each other in an axial direction.

The apparatus of the present invention comprises the following elements:
- a motor;
- a board on which the motor is mounted; and
- a driver for driving the motor which has the structure discussed above.

These structures allow the motor to be smaller, thinner and light weighted. The apparatus using this motor can be also smaller, thinner and light weighted, and yet, excellent impact-resistance is obtainable.

DETAILED DESCRIPTION OF THE INVENTION

Exemplary embodiments of the present invention are demonstrated hereinafter with reference to the accompanying drawings.

First Exemplary Embodiment

Figure 1:
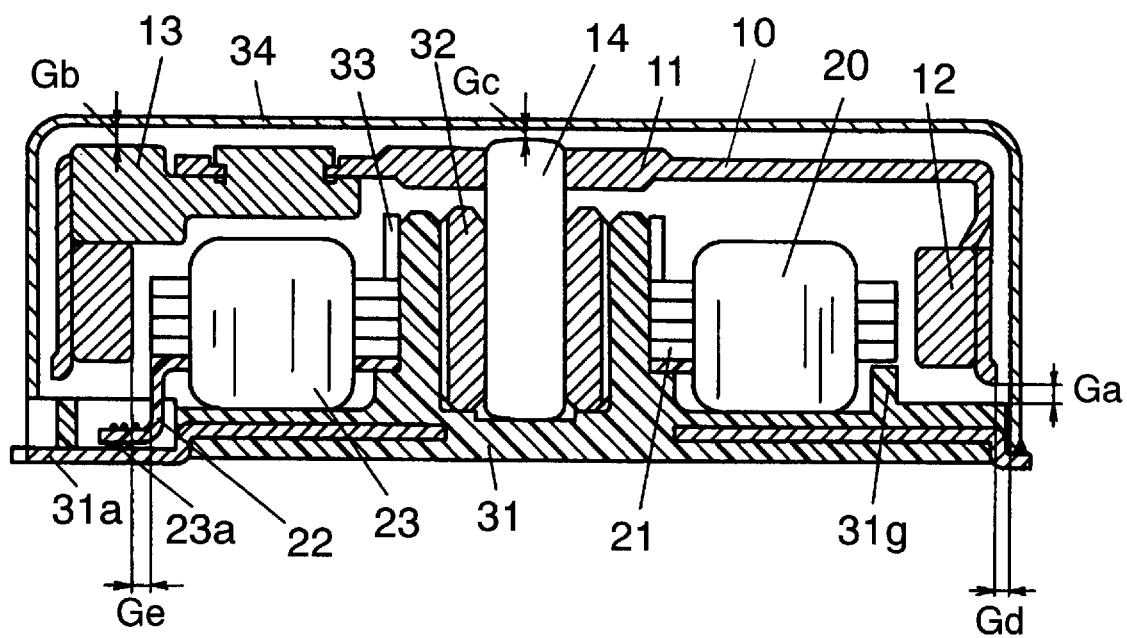
FIG. 1 is a lateral cross section illustrating a structure of a motor in accordance with a first exemplary embodiment of the present invention.
Figure 2A:
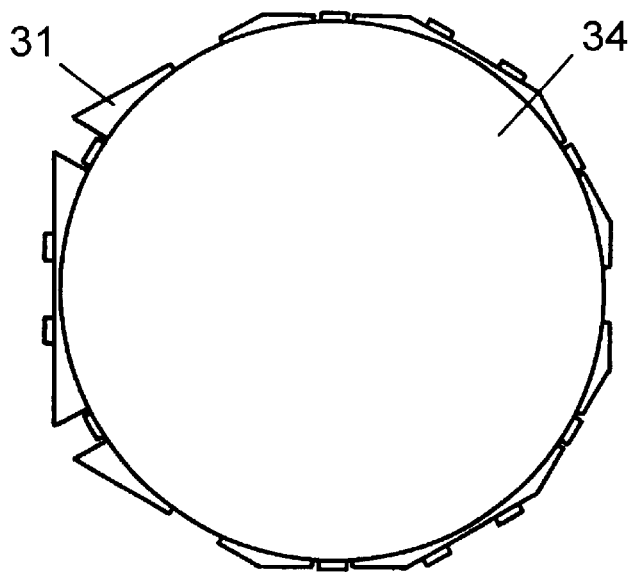
FIG. 2A is a plan view of the motor in the first embodiment.
Figure 2B:
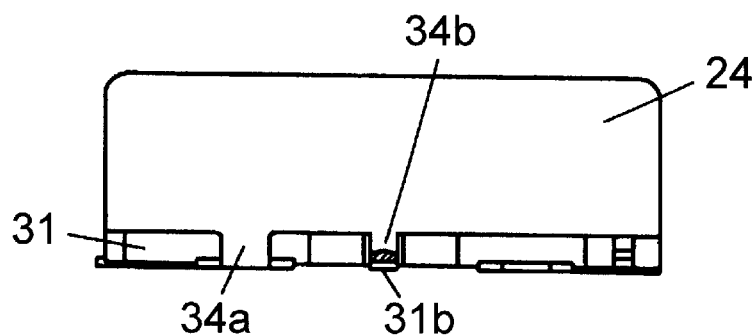
FIG. 2B is a lateral view of the motor in the first embodiment.
Figure 2C:
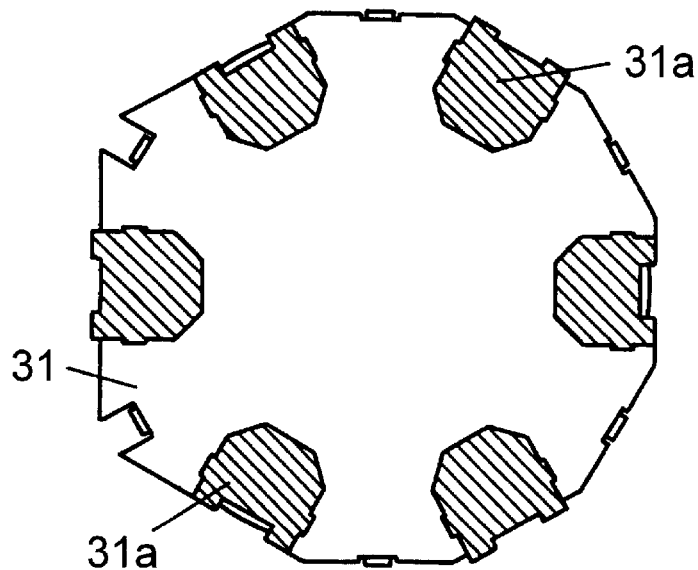
FIG. 2C is a bottom view of the motor in the first embodiment.
Figure 3A:
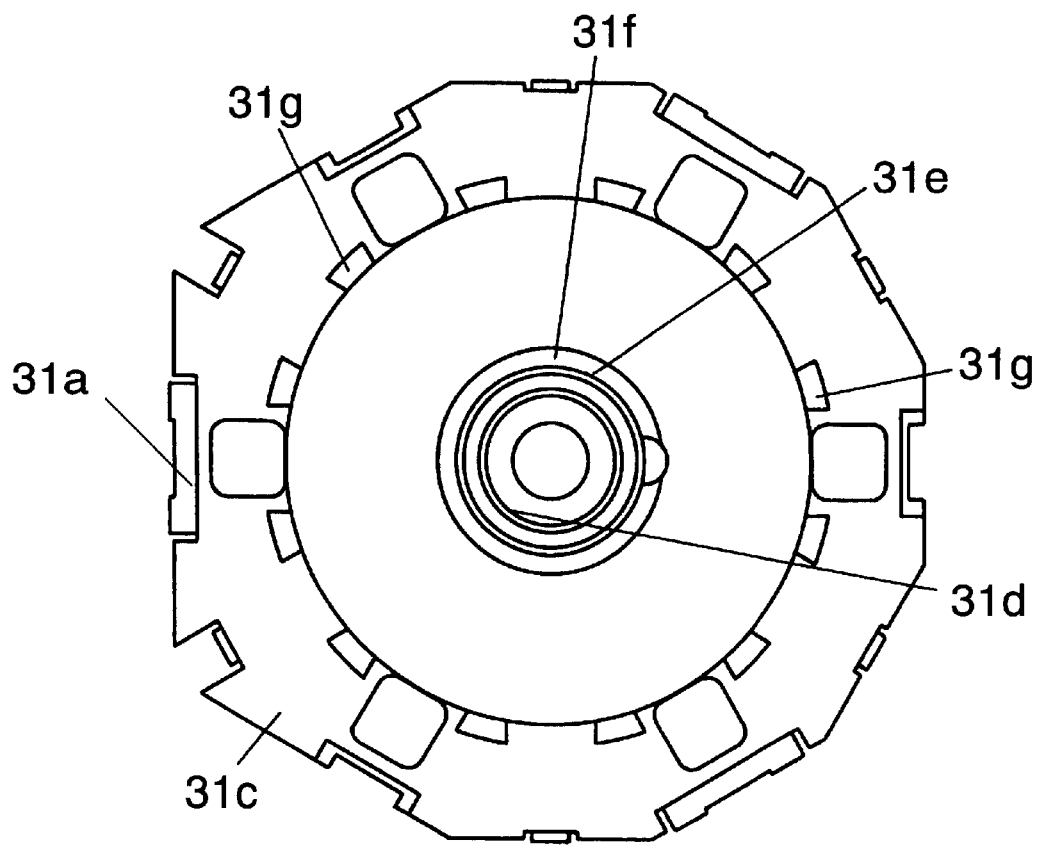
FIG. 3A is a plan view of a motor base in the first embodiment.
Figure 3B:
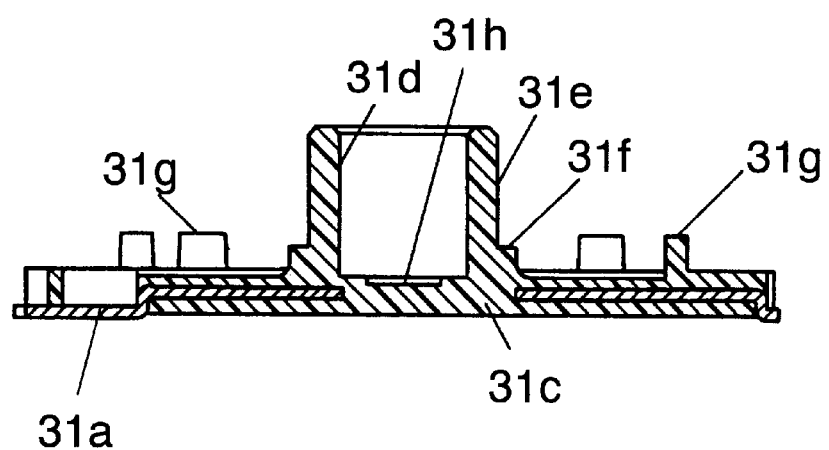
FIG. 3B is a lateral cross section of the motor base in the first embodiment.
Figure 4A:
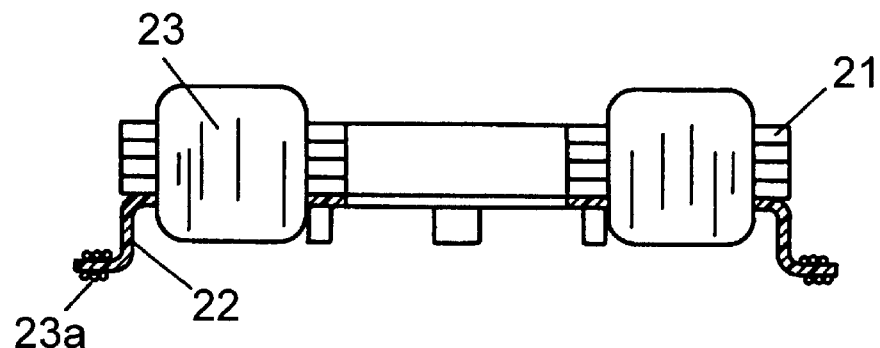
FIG. 4A is a lateral view of a stator assembly in the first embodiment.
Figure 4B:
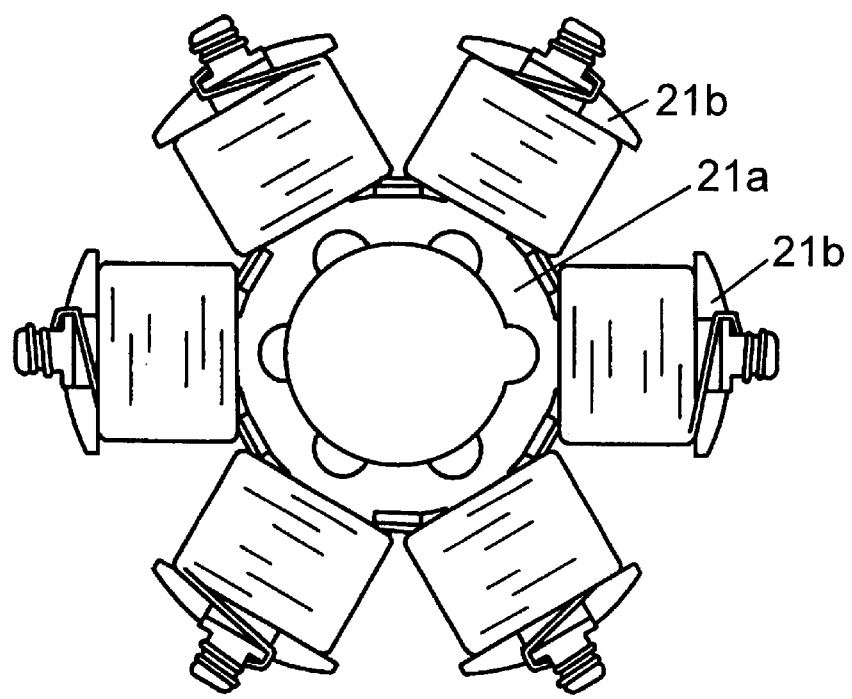
FIG. 4B is a plan view of the stator assembly in the first embodiment.
Figure 5A:
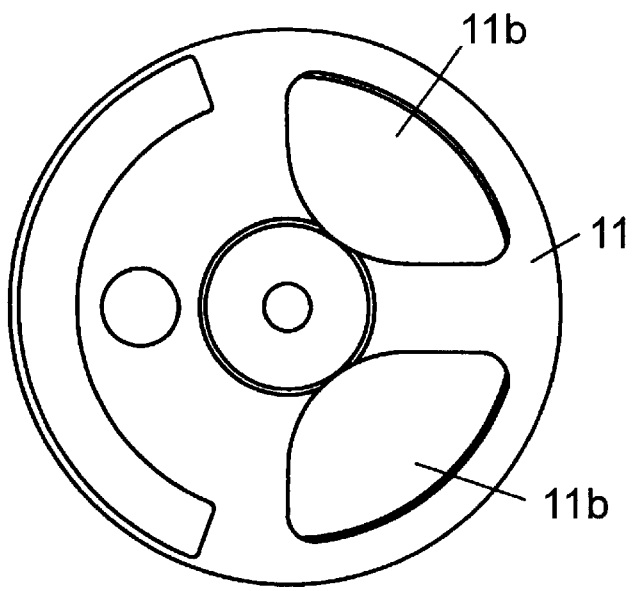
FIG. 5A is a plan view of a rotor in the first embodiment.
Figure 5B:
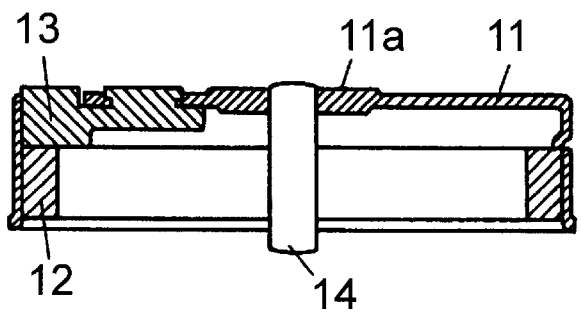
FIG. 5B is a lateral cross section of the rotor in the first embodiment.
Figure 5C:
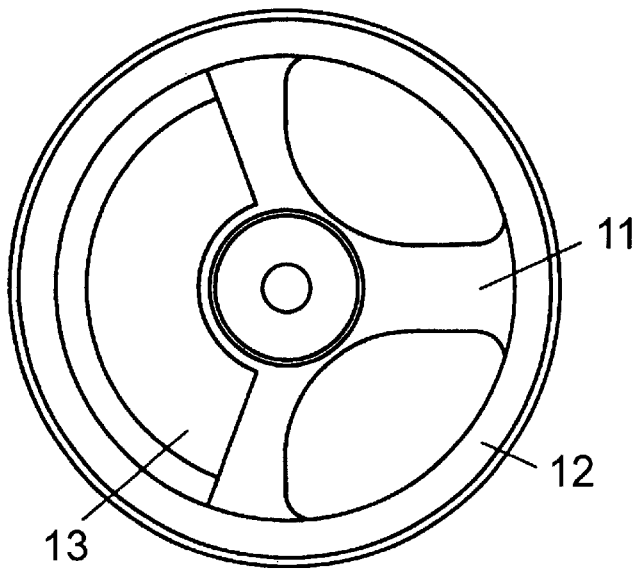
FIG. 5C is a bottom view of the rotor in the first embodiment.

FIG. 1 is a lateral cross section illustrating a structure of a motor in accordance with the first exemplary embodiment of the present invention. FIG. 2A is a plan view of the same motor. FIG. 2B is a lateral view of the same motor. FIG. 2C is a bottom view of the same motor. FIG. 3A is a plan view of a motor base in the first embodiment. FIG. 3B is a lateral cross section of the same motor base. FIG. 4A is a lateral view of a stator assembly in the first embodiment. FIG. 4B is a plan view of the same stator assembly. FIG. 5A is a plan view of a rotor in the first embodiment. FIG. 5B is a lateral cross section of the same rotor. FIG. 5C is a bottom view of the same rotor.

In this first embodiment, several measures for improving impact-resistance are realized in the motor. In the first place, an entire construction of the motor is described, and then individual measures with their advantages are demonstrated.

In FIG. 1, the motor comprises the following elements:
  stator assembly 20 (stationary section);
  rotor 10 (rotational section); and
  cover 34.

Rotor 10 comprises cup-shaped rotor frame 11 and ring-shaped magnet 12 attached to an inner wall of rotor frame 11. Eccentric weight 13 is also attached to frame 11. Rotor 10 spins on shaft 14 mounted at the center of frame 11.

A stator is formed by combining motor base 31 and stator assembly 20. Stator assembly 20 comprises the following elements:
  stator core 21;
  winding terminator 22; and
  winding 23.

At the center of base 31, bearing 32—made of e.g. metal—is mounted vertically. Stator assembly 20 is fixed to base 31 by bushing 33.

Winding 23 is wound on core 21 and its end 23a is arc-welded to terminal 31a of base 31. Bearing 32 journals shaft 14 of rotor 10. The outer wall of stator assembly 20, i.e. the outer wall of core 21 faces the inner wall of magnet 12 in a radial direction, and cover 34 covers those elements.

An appearance of the motor in accordance with the first embodiment is shown in FIGS. 2A–2C. The dimensions of the motor are, e.g. diameter: 10 mm, thickness: 3.4 mm. The motor shapes in small and flat profile. It weighs approx. 1 g. As the plan view of FIG. 2A shows, circular cover 34 is placed on polygonal base 31. As shown in FIG. 2B, cover 34 has several protrusions 34a, 34b extending toward base 31. Some of them extend to the lower end of base 31, and some of them are welded with metal tips 31b protruded to a side face of base 31. On the bottom face of the motor, six terminals 31a are exposed as shown in FIG. 2C. These terminals can be reflow-soldered to a board (not shown) of an apparatus, e.g. a cellular phone. This motor is soldered to the apparatus board, and is powered to the winding via terminals 31a on the bottom face and controlled, so that rotor 10 spins. Eccentric weight 13 attached to the rotor then spins and produces vibrations, which then vibrates the apparatus.

Next, the construction of the motor base is detailed hereinafter. FIGS. 3A and 3B show a shape of motor base of the present invention. As shown in FIG. 3B, motor base 31 is formed by molded resin and comprises the following elements:
  base section 31c shaping in substantially a flat board;
  bearing supporter 31d for journaling the bearing, and protruding from the center of base section 31c;
  stator supporter 31e for mounting stator assembly 20, concentric with bearing supporter 31d.

Bearing supporter 31d and stator supporter 31e are unitarily formed into a cylinder. Bearing supporter 31d is the inner wall of the cylinder, and stator supporter 31e is the outer wall. Step 31f disposed around the lower section of the outer wall is a part of stator supporter 31e. Base 31 includes stator stopper 31g protruding from base section 31c toward a lower end face of the outer wall of stator assembly 20. A thrust bearing is formed by thrust-bearing section 31h situated at the center of the bottom face of bearing supporter 31d.

On base section 31c, six terminals 31a are disposed around bearing supporter 31d as shown in FIG. 3A. Terminals 31a are made of metal plate and insert-molded in base section 31c. The upper face of terminal 31a functions as a connecting terminal for coupling winding end 23a of stator assembly 20. The lower face of terminal 31a is exposed on the bottom face of base section 31c and functions as a mounting terminal to be reflow-soldered to the board of an apparatus. As shown in FIG. 3B, the metal plate of terminal 31a on the bearing supporter side is buried in base section 31c and extends toward bearing supporter 31d.

FIGS. 4A and 4B illustrate the stator assembly to be mounted to the motor base. As shown in FIG. 4B, stator core 21 comprises ring 21a at the center and six teeth 21b protruding from ring 21a in the radial direction. Thin insulating film is formed on core 21, and the end face of core 21 is overlaid on winding terminator 22, then winding 23 is wound on core 21 together with winding terminator 22. The winding end 23a is held by terminator 22.

FIGS. 5A–5C illustrate the rotor. Rotor frame 11 shapes in a cup. At the center of frame 11, shaft 14 is rigidly mounted to shaft coupling section 11a, and eccentric weight 13 is attached to inside of the top plate of frame 11. Further, magnet 12 clamps weight 13. Weight 13 is rigidly caulked to the top plate of frame 11. Two holes 11b shaping in clam-shells are provided on the top plate of frame 11.

As described in FIG. 1, these elements are assembled as if they are piled up on motor base 31. In other words, bearing 32 is fit into bearing supporter 31d. Stator assembly 20 is fit on the outer wall of stator supporter 31e, then fixed thereto by bushing 33. Shaft 14 of rotor 10 is inserted into bearing 32. Cover 34 is placed on these whole elements. As such, they are assembled with ease and at high speed.

The overall structure is discussed above, and now individual measures of improving impact-resistance are demonstrated hereinafter. The motor used in the first embodiment is an outer rotor type flat and brush-less motor with cores. The weak points of this motor, in general, are radial and thrust bearings, the coupling section between the bearing supporter and the motor base, coupling section of the shaft, and the coupling section between the motor and the apparatus. The following measures are taken in order to protect these weak points:

1. Use lightweight materials.

Firstly, the construction of outer rotor type with cores is one of the methods to realize this measures. This structure, i.e. a core-less stator face the rotor via axial air-gap, permits high-permeability as well as lightweight. Secondly, the motor base made of resin and the cover made of thin metal plate are employed to reduce the weight.

2. Integrate the elements for preparing a rationalized structure in order to bear the load.

3. Disperse the impact applied to the weak points.

4. Prevent the weak points from being exposed to impact.

The above measures are taken to improve the impact-resistance. Items 2–4 are detailed hereinafter.

The motor in accordance with the first embodiment has bearing supporter 31d protruding vertically from base section 31c and stator supporter 31e. Around supporter 31d, a plurality of mounting terminals 31a are insert-molded. The lower faces of terminals 31a are exposed from the bottom face of motor base 31 to be soldered. In other words, bearing supporter 31d and terminals 31a can be strongly coupled each other by base 31 which is formed by insert-molding.

Terminals 31a placed in an extensive area around bearing supporter 31d are connected directly to a board of the apparatus, therefore, bearing supporter 31d to which large load is applied can bear a large impact due to self-weights of rotor 10 and stator assembly 20, thereby firmly supporting rotor 10.

At least a section on bearing supporter 31d side of terminals 31a is buried in base section 31c, namely, the metal plates forming terminals 31a effectively support bearing supporter 31d by the buried sections on the bearing supporter side. This structure strengthens the impact-resistance of bearing supporter 31d.

As such, respective elements are integrated by the insert-molding, thereby directly coupling bearing supporter 31d with terminals 31a, and dispersedly placing terminals 31a. These arrangements make the entire structure rational.

As shown in FIG. 1, the inner wall of stator assembly 20 is fit on and fixed to the outer wall of stator supporter 31e, and stator stopper 31g faces closely a lower end face of the outer wall of stator assembly 20 via axial air gap. This structure allows bearing supporter 31d to be regulated its slant or displacement when load is applied to the rotor or the stator assembly. This mechanism prevents the coupling section between bearing supporter 31d and base 31 from being damaged, and improves the impact-resistance. Stator stopper 31g in this embodiment is formed of resin-made protrusion; however, it may be formed by a protrusion made of metal plate inserted. Impact applied to self-standing bearing supporter 31d is thus alleviated, so that supporter 31d is protected from being damaged.

In the motor used in this first embodiment, clearance Gd in a radial direction between the outer wall of rotor 10 and the inner wall of cover 34 is set narrower than clearance Ge between the outer wall of stator assembly 20 and the inner wall of magnet 12. Therefore, when impact in the radial direction is applied, the outer wall of rotor 10 touches the inner wall of cover 34 before stator assembly 20 touches magnet 12. As a result, the impact applied to bearing supporter 31d via stator assembly 20 is eliminated or weakened, so that supporter 31d as well as bearing 32 can be protected from the impact in the radial direction. At the same time, the surface of inner wall of magnet 20 made of fragile material can be protected from being damaged.

In the motor in accordance with the first embodiment, clearance Gd is set such that when acceleration greater than a first acceleration (operating acceleration) and smaller than a second acceleration (maximum durable acceleration) is applied, rotor 10 touches cover 34. This mechanism allows the outer wall of rotor 10 to touch the inner wall of cover 34 before motor elements such as bearing supporter 31d, bearing 32, and rotor 10 are damaged. Therefore, this mechanism protects the motor elements from being damaged.

In the motor in accordance with the first embodiment, clearance Ga in the thrust direction between an end face of rotor 10 and the upper face of motor base 31 is set such that when acceleration greater than the first acceleration and smaller than the second acceleration is applied, the end face of rotor 10 touches the upper face of motor base 31. In other words, when impact in the thrust direction is applied, the end face of rotor 10 touches the confronting upper face of motor base 31 before the motor elements such as thrust bearing section 31h, coupling section 11a of shaft, are damaged. Therefore, this mechanism protects the motor elements from being damaged.

In the motor in accordance with the first embodiment, a clearance in the thrust direction between an upper face of rotor 10 and confronting cover 34 is set such that when acceleration greater than the first acceleration and smaller than the second acceleration is applied, the upper face of rotor 10 touches cover 34. This clearance in the thrust direction in this embodiment is a result of a subtraction of clearance Gb between the upper face of rotor 10 and cover 34–(minus) clearance Gc between a tip of shaft 14 and cover 34. When impact in the thrust direction is applied, the upper face of rotor 10 touches the confronting cover 34 before the motor elements such as coupling section 11a of the rotor shaft, cover 34 are damaged or deformed. As a result, the impact load is born by both the touched section and a touched section of the shaft, so that the motor elements are protected from being damaged.

When an apparatus, e.g. a cellular phone, using the motor is regularly operated at the first acceleration applied to the motor, the motor works normally thanks to the various measures discussed above. When the apparatus using the motor is operated at such an excessive second acceleration as causes deformation or damage to the motor elements, the impact applied to the weak points can be dispersed, or the impact can be managed to avoid being applied to the weak points thanks to the various measures discussed above. As a result, the motor elements can be rather smaller, thinner and lighter weighted than a conventional motor. The second acceleration can be understood as the maximum durable acceleration against dropping the apparatus.

For producing these advantages effectively, rotor 10 may as well be elastically deformed. For this purpose, rotor frame 11 is formed of thin metal plate, or hole 11b is provided on a top plate of frame 11. This structure is effective for elastic deformation and it also lightens rotor 10.

In the motor in accordance with the first embodiment, eccentric weight 13 is clamped between the inner face of the top plate of rotor frame 11 and the upper face of magnet 12. Since the weight is clamped vertically, it does not come off by centrifugal force or impact. Further, weight 13 is rigidly caulked to the hole provided on the top plate of frame 11. Therefore, impact in any direction cannot drop the weight. When weight 13 is rigidly caulked to the cup-shaped frame 11, it is caulked to the top plate or the outer wall, and the top plate is selected rather than the outer wall because caulking can be done with ease.

In the motor in accordance with the first embodiment, motor base 31 has a plurality of mounting terminals 31a on its bottom face for soldering. A unit area mass, i.e. the self-weight of the motor is divided by the total area of terminals 31a, is not more than 0.1 g/mm$^2$. As such, the motor is supported and connected by wide area, so that impact, applied to soldered faces, per unit area is reduced.

In this case, joining material (solder) of joining strength 20N/mm$^2$ is used to obtain quality soldering, so that only reflow-soldering without any other retaining means allows the motor to bear excessive impact such as 10,000–20,000 G.

The per unit area mass is preferably not more than 0.08 g/mm$^2$, so that the solder of less joining strength can be used. It is more preferable to make the per unit area mass not more than 0.06 g/mm$^2$, so that the joining area can be somewhat reduced.

When quality of soldering is considered, the area of one mounting terminal is preferably not more than 10 mm$^2$ depending on its shape. If the area of one terminal becomes too large, a number of terminals is preferably increased.

Second Exemplary Embodiment

Figure 6A:
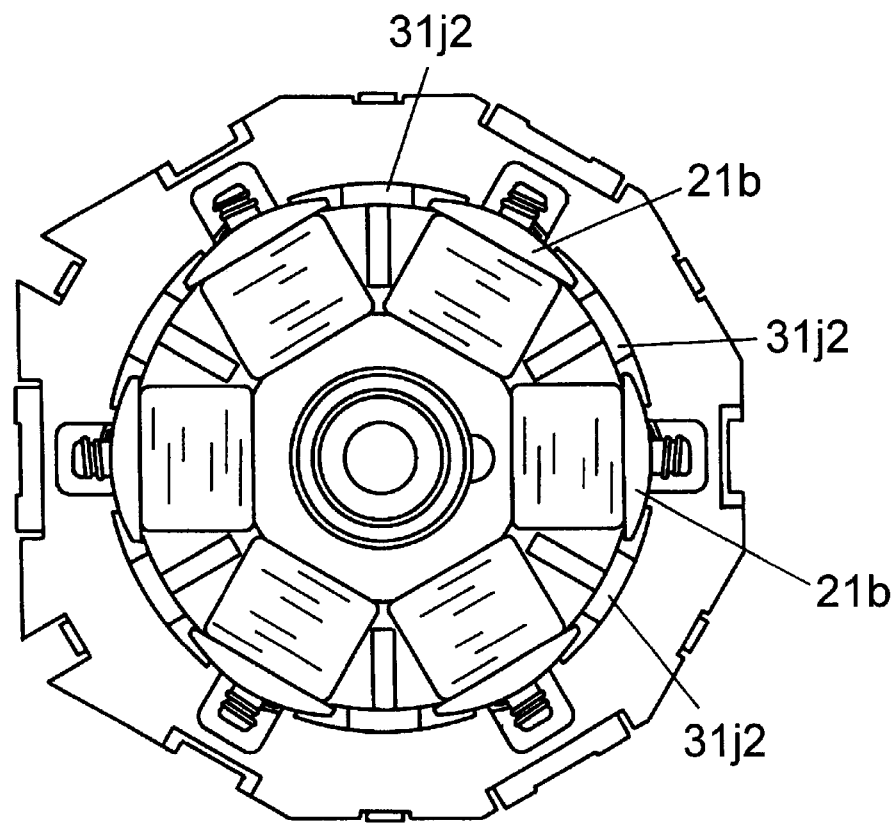
FIG. 6A is a plan view illustrating relations among major components in accordance with a second exemplary embodiment of the present invention.
Figure 6B:
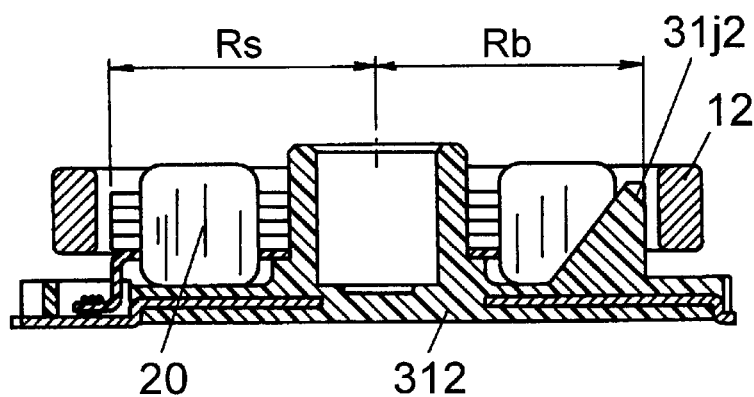
FIG. 6B is a lateral cross section illustrating relations among major components in accordance with the second embodiment.

FIG. 6A is a plan view illustrating relations among major elements in accordance with the second exemplary embodiment. FIG. 6B is a lateral cross section of FIG. 6A, and illustrates relations among major elements of a motor, i.e. motor base 312, stator assembly 20, and magnet 12.

A feature of the second embodiment is shown on the right side of FIG. 6B, i.e. roughly triangularly protruded rotor stopper 31*j*2 is provided. Rotor stopper 31*j*2 protrudes from base 312 toward stator assembly 20. The height of the protrusion is higher than the upper face of stator core of stator assembly 20. Other elements and other parts of the motor-base remain the same as those in the first embodiment. As shown in FIG. 6A, rotor stopper 31*j*2 is provided in space between teeth 21*b*. The plan view of each rotor-stoppers 31*j*2 looks substantially letter T. A radius Rb of an outer wall of the stopper is set such that radius Rb substantially equals to or greater than an outer wall radius Rs of stator assembly 20.

As such, in the second embodiment of the present invention, the rotor stopper protruding from the base section toward the space between the teeth is provided. The radius of outer wall of the stopper is set substantially equal to or greater than the radius of outer wall of the stator assembly. Thus when impact in the radius direction applied, the inner wall of magnet touches the outer wall of stator assembly and the outer wall of rotor stopper. Therefore, the impact loaded to the bearing supporter via the stator assembly can be decreased, so that the bearing supporter and the bearing can be protected from radial impact. In particular, when the radius Rb of outer wall of the rotor stopper is set greater than the radius Rs of outer wall of the stator assembly, the magnet is prevented from touching the outer rim of the stator assembly made of hard magnetic material. As a result, the inner wall of the magnet made of rather fragile material can be prevented from damages.

Third Exemplary Embodiment

Figure 7:
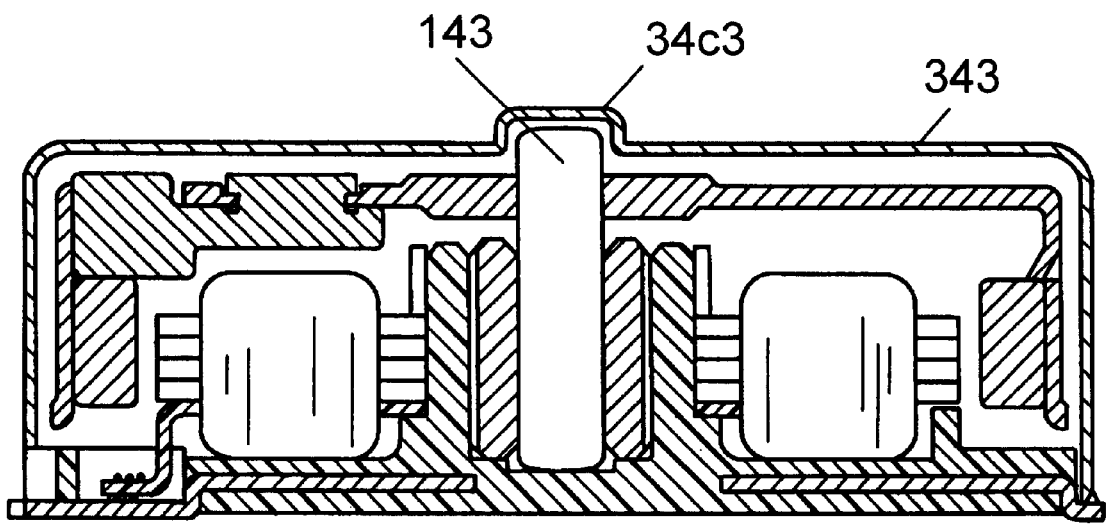
FIG. 7 is a lateral cross section of a motor in accordance with a third exemplary embodiment of the present invention.

FIG. 7 is a lateral cross section of a motor in accordance with the third exemplary embodiment of the present invention.

In FIG. 7, a small cup-shaped recess 34*c*3 is provided at the center of upper face of cover 343. An end of shaft 143 is inserted into the recess. This is the feature of the third embodiment. Other elements and other parts of cover remain the same as the first embodiment.

This recess 34*c*3 is referred to as a shaft stopper, of which inner diameter is greater than the diameter of the shaft. The end of shaft is inserted into recess 34*c*3, and yet, the shaft can spin during the operation without touching the recess.

This structure allows to regulate the rotor from slanting when radial impact is applied, and to restrict impact stress applied to the bearing supporter and the bearing. As a result, the impact-resistance of the motor can be improved. Shaft stopper 34*c*3 can be a hole instead of the recess.

Fourth Exemplary Embodiment

Figure 8:
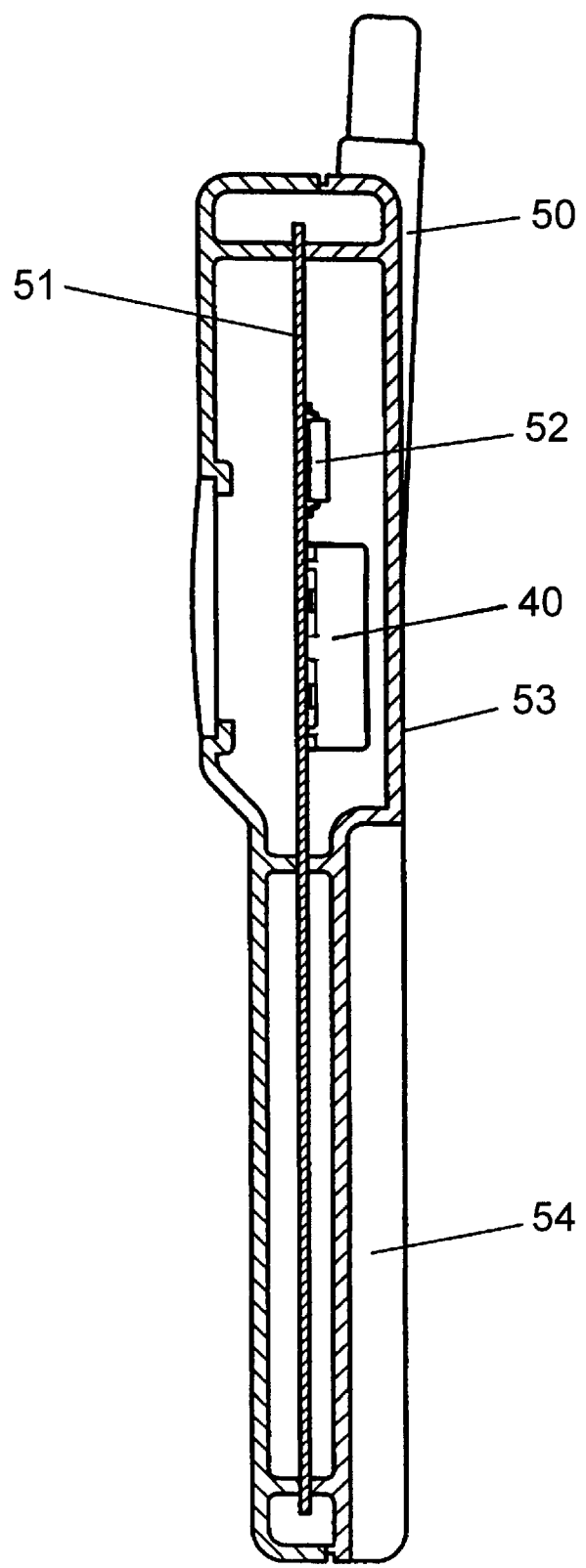
FIG. 8 is a lateral cross section of an apparatus in accordance with a fourth exemplary embodiment of the present invention.

An apparatus using the motor of the present invention is demonstrated hereinafter. FIG. 8 is a lateral cross section illustrating a structure of the apparatus in accordance with the fourth embodiment.

In FIG. 8, apparatus 50 is a cellular phone, where motor 40 described in the first embodiment is used. Motor 40 is directly mounted to apparatus board 51. In other words, a lower face of the motor terminal is reflow-soldered to a land of upper face of board 51. On board 51, motor driver IC 52 is reflow-soldered, in addition to other components of the apparatus. Battery 54 is mounted to inside of housing 53 of apparatus 50. Battery 54 powers the circuit of apparatus 50 and IC 52. Motor 40 is also powered by batter 54 via the land of board 51 and the motor terminal, so that the stator is excited. Attraction and repulsion between the stator and magnet spins the rotor. Since the rotor has an eccentric weight, the rotation of the rotor delivers vibrations to apparatus 50, so that tactile information such as a call, or an alarm is delivered to the user. Board 51 is placed in parallel with the bottom plate of housing 53 of the apparatus, and the motor shaft is placed in vertical to board 51, so that vibrations are produced in parallel to the bottom face of apparatus 50.

The apparatus in accordance with the fourth embodiment employs the small and thin motor featuring excellent impact-resistance, so that a compact and thin apparatus with excellent impact-resistance is obtainable. The motor is reflow-soldered to the apparatus board, so that productivity and reliability of the apparatus are improved. Further, the motor shaft is placed vertically to the bottom plate of the apparatus, so that the vibrations are produced in parallel with the bottom plate. Therefore, when the apparatus, e.g., is placed on a table, the buoyancy from the table is so little that the apparatus is prevented from falling to the floor.

The present invention provides radial and thrust bearings, a coupling section of a bearing supporter and a motor base, a coupling section of a shaft, a coupling section of a motor and an apparatus, and a magnet with measures of improving impact-resistance, so that the motor with excellent impact-resistance is obtainable, and the apparatus using the same motor can be provided.

Several embodiments are described heretofore; however, the present invention is not limited to those embodiments, and can be modified in various ways within the scope and spirit of the present invention.

The present invention can be favorably applied to a flat-shaped vibration motor with cores, used in a cellular phone, and the embodiments using a cellular phone were demonstrated; however, the present invention can be applied to other application and motors having other structures. In the embodiments, the bearing made of sintered metal is used; however, other types of bearing, e.g. a hydro-dynamic-bearing or a ball bearing, can be used, or a bearing formed together with the motor base can be also used. The cover in the present invention functions as covering outer rim of the rotor or above the rotor and restricting the rotor from moving. Therefore, the cover can be in a shape surrounding the outer wall of the rotor, and formed together with the motor base.

What is claimed is:

1. A motor comprising:
   a rotor;
   a stator assembly facing said rotor; and
   a motor base including:
      a base section;
      a bearing supporter for supporting a bearing vertically with respect to said base section;
      a stator supporter, substantially concentric with said bearing supporter, for being mounted with said stator assembly, and;
      a metal terminal disposed radially, by insert molding, around said bearing supporter substantially parallel to a bottom face of said base section, said metal terminal including a buried section, said buried section being buried within, and extending parallel to, said base section.

2. The motor as defined in claim 1, wherein said bearing supporter is unitarily formed with said stator supporter.

3. The motor as defined in claim 1 further comprising a stator stopper protrudently provided on said base section, wherein an inner wall of said stator assembly is fit on an outer wall of said stator supporter, and said stator stopper closely faces a lower end face of an outer wall of said stator assembly in an axial direction.

4. A motor comprising:

a rotor;

a stator assembly facing said rotor;

a motor base for mounting said stator assembly; and a mounting terminal disposed radially, by insert molding, on a bottom face of said motor base, said terminal including a buried section, said buried section being buried within, and extending parallel to said base section, wherein a unit area mass, derived from dividing a self weight of said motor by a total area of said mounting terminals, is not more than 0.1 g/mm$^2$.

5. An apparatus comprising:

a motor;

a board on which said motor is mounted; and a driver for driving said motor, said motor including:
   a rotor;
   a stator assembly facing said rotor; and
   a motor base including;
      a base section;
      a bearing supporter for supporting a bearing vertically with respect to said base section;
      a stator supporter, substantially concentric with said bearing supporter, for being mounted with said stator assembly, and
      a metal terminal disposed radially, by insert molding, around said bearing supporter substantially parallel to a bottom face of said base section, said metal terminal including a buried section, said buried section being buried within, and extending parallel to said base section.

6. An apparatus comprising:

a motor;

a board on which said motor is mounted; and a driver for driving said motor, said motor including:
   a rotor;
   a stator assembly facing said rotor;
   a motor base for mounting said stator assembly; and
   a mounting terminal disposed radially, by insert molding, on a bottom face of said motor base, said metal terminal including a buried section, said buried section being buried within, and extending parallel to said base section wherein a unit area mass, derived from dividing a self weight of said motor by a total area of said mounting terminals, is not more than 0.1 g/mm$^2$.

\* \* \* \* \*